United States Patent [19]

Renaud

[11] 4,361,451
[45] Nov. 30, 1982

[54] PROCESS FOR EVERTING A LINING INTO A CONDUIT UTILIZING TWO INJECTION FLUIDS

[75] Inventor: Alain P. Renaud, Montfermeil, France

[73] Assignee: Coopetanche S.A., Courtry, France

[21] Appl. No.: 252,088

[22] Filed: Apr. 8, 1981

[30] Foreign Application Priority Data

Apr. 18, 1980 [FR] France .................... 80 08679

[51] Int. Cl.³ .......................................... B29C 17/07
[52] U.S. Cl. ..................................... 156/64; 156/218; 156/281; 156/287; 156/294; 156/378; 156/497; 156/583.3
[58] Field of Search .............. 156/285, 286, 287, 294, 156/281, 311, 218, 156, 497, 583.3, 64, 378

[56] References Cited

U.S. PATENT DOCUMENTS

| | | | |
|---|---|---|---|
| 2,343,225 | 2/1944 | Pray et al. | 156/287 |
| 2,417,881 | 3/1947 | Munger | 156/287 |
| 3,258,377 | 6/1966 | Scott | 156/287 |
| 3,471,407 | 10/1969 | Spring | 134/40 |
| 3,511,734 | 5/1970 | Darrow | 156/287 |
| 3,535,161 | 10/1970 | Gutrich | 134/24 |
| 3,600,225 | 8/1971 | Parmelee | 134/24 |
| 4,135,958 | 1/1979 | Wood | 156/287 |
| 4,273,605 | 6/1981 | Ross | 156/287 |

FOREIGN PATENT DOCUMENTS

| | | | |
|---|---|---|---|
| 475828 | 7/1974 | Australia | 156/294 |
| 53-64283 | 6/1978 | Japan | 156/294 |

Primary Examiner—Jerome W. Massie
Attorney, Agent, or Firm—McAulay, Fields, Fisher, Goldstein & Nissen

[57] ABSTRACT

Process for internally lining a conduit by bonding with a resin to the inner wall of the conduit, of a fluidtight inner lining sleeve under the urging of at least one pressurized fluid acting on the inner wall of the sleeve through an inflatable envelope. The temperature in the envelope required for polymerization of the resin, and the pressure inside the inflated envelope may be controlled.

12 Claims, 3 Drawing Figures

PROCESS FOR EVERTING A LINING INTO A CONDUIT UTILIZING TWO INJECTION FLUIDS

BACKGROUND OF THE INVENTION

The present invention relates to a process for internally lining a conduit by bonding with a resin to the inner wall the conduit, of an inner sealed lining sleeve, by under the urging of a pressurized fluid on the inner wall of the sleeve.

Such a process is advantageous from the technical and economical points of view for preventing or repairing damage to the conduit or for obtaining a smooth inner wall and/or a wall resistant to different chemical products. The sleeve may be adapted to any configuration of the section of the conduit. Conduits of great length up to 300 m and more may be lined in this way. The cross sections of the conduits may vary from approximately 50 $cm^2$ to sections of several $m^2$. The conduits may be of any kind and of any material and may, for example, be conduits buried in concrete or the like.

In the known processes, since the material used for the sleeves is not resilient, the dimensions of the sleeve and particularly of its cross section must be very accurate so as to allow suitable application of the outer wall of the sleeve to the inner wall of the conduit. In known processes, either the outer wall of the sleeve or the inner wall of the conduit is coated with a resin, this resin being polymerized when the sleeve is applied against the conduit. Since the polymerization of a resin generally takes place at an optimum temperature maintained substantially constant for a given length of time, the known processes have not solved the problem of permanently controlling the temperature during the period of application of the sleeve against the conduit. Furthermore, since the sleeve (or conduit) is generally coated in situ, the thickness of the resin is not even and the adhesive application of the sleeve takes place in an uneven and inaccurate way.

SUMMARY OF THE INVENTION

The present invention aims at remedying these drawbacks and at providing a process for internally lining a conduit which comprises the following steps:

(a) cleaning of the inner wall of the conduit;

(b) preparation of an inner lining sleeve from a single flexible and fluidtight sheet whose surface intended to be the inner wall is smooth and whose surface intended to be the outer wall is fibrous, the length of said sheet being substantially equal to the conduit to be lined and the width of this sheet being equal to or slightly greater than the periphery of the inner section of said conduit; the section and/or the diameter of the sleeve formed in this latter case being variable, for example increasing when a pressure is applied to its inner wall;

(c) coating the inner wall of the conduit with a first resin;

(d) introducing a light, flexible and fluidtight envelope, provided with at least one closable pipe at each of its ends, into the sleeve, either before formation of the sleeve, or after formation thereof so that each of the ends of this envelope extends beyond the corresponding end of the sleeve; the cross section of the envelope being such that, when it is inflated, it may exert a pressure on the sleeve so as to apply it against the conduit;

(e) coating the outer fibrous wall of the sleeve is coated with a second resin;

(f) introducing the assembly formed by the resin-coated sleeve and envelope into the conduit whose inner wall is also coated with a resin;

(g) placing a cap, made from a strong flexible material and comprising a tubular portion and a bottom, over each of the ends of the envelope, the length of the tubular portion being substantially greater than the outer diameter of the bottom of the cap; which is slightly less than the inner diameter of the formed sleeve so that, when the envelope is inflated, the tubular portion of the cap is firmly applied against the sleeve, the cap being maintained in position by the frictional force between the outer wall of the tubular portion and the inner wall of the sleeve;

(h) introducing a first pressurized fluid into the envelope through a first pipe disposed at a first end of said envelope, whereas the pipe or pipes disposed at the other end of the envelope is (are) closed; this procedure for inflating the envelope being continued until the sleeve is firmly applied against the inner wall of the conduit through a resin layer(s), until polymerization of the resin(s) disposed between the sleeve and the inner wall of the conduit;

(i) introducing if desired, a second hot fluid under pressure into the envelope, before polymerization of the resin(s), through a first or through a second pipe disposed at the first end of the envelope, the pipe or pipes disposed at the second end of the envelope being maintained sufficiently open to allow the first fluid to escape at least partially; this step being continued until a sufficiently high temperature is reached in the envelope to cause polymerization of the resin(s) disposed between the outer wall of the sleeve and the inner wall of the conduit, and continued until total polymerization of the resin or resins used;

(j) deflating and withdrawing the envelope from the sleeve the inner lining sleeve being firmly bonded to the inner wall of the conduit and;

(k) removing the water which has accumulated in the envelope during the above step (i).

DISCLOSURE OF BEST MODE OF THE INVENTION

Cleaning of the conduit is effected by projecting under pressure a detergent or grease-remover such as diluted soda onto the inner wall followed by rinsing with sprayed water at a temperature of 65° C. to 85° C., at a pressure of 120 to 140 bar.

According to one characteristic of the invention, the sleeve is formed from a sheet having a width equal to the periphery of the inner section of the conduit by folding thereof along its width over the whole of its length so as to form an edge-to-edge joint, the fixed connection between the edges being provided in any appropriate way such as welding, adhesion, application of a butt-strip, etc.

According to another characteristic of the invention, the sleeve is formed from said sheet by folding thereof along its width over the whole of its length, so as to create a flanged joint, the fixed connection between the outer wall of the sleeve and its inner wall at the position of the flange being provided by a sealing compound which allows the sleeve to increase its section when deformed under the action of a pressurized fluid on the inner wall of the sleeve until the outer wall of the resin-coated sleeve is firmly applied against the inner wall of the conduit also resin-coated.

The material of the envelope is flexible and light such, for example, as polyethylene, polyvinyl or butyl. The envelope may be inflated without undergoing an elastic deformation. Its cross section may be at least equal to the inner section of the formed sleeve.

According to an important characteristic of the invention, the second above-mentioned fluid is a spray of hot water having a temperature of 55° C. to 85° C.

According to yet another characteristic of the invention, during polymerization of the resin(s), the temperature in the envelope is maintained at a value of about 20° C. to 60° C. by appropriate adjustment of the amount and temperature of the hot water injected into the envelope and by controlling the quantity and/or pressure and the temperature of the fluid removed through the pipe disposed at said second end of the envelope.

BRIEF DESCRIPTION OF THE DRAWINGS

Other characteristics and advantages will appear from the following text and accompanying figures, given solely by way of example.

DESCRIPTION OF THE PREFERRED EMBODIMENT

Conduit 1 must be prepared for lining. For that, the inner wall of the conduit is cleaned, for example mechanically by brushing, scraping, etc. or by chemical means. One efficient cleaning method consists in projecting a detergent or grease-remover, such as diluted soda, over the whole of the inner wall of the conduit. This operation may, for example, be carried out by feeding the diluted soda under pressure from a reservoir into a pipe and projecting it radially for example by means of a propeller device or similar from the inlet point towards the inner wall of conduit 1, the projecting device advancing in the conduit to be lined from one of its ends to the other either by mechanical or manual traction, or else by means of a self-propelled carriage. The same system and even the same fluid-projecting apparatus can be used for the rinsing operation which is effected subsequently at a pressure of 120 to 140 bars with water sprayed at a temperature between 65° C. and 85° C.

The same system—and even the same apparatus—can subsequently be used for projecting a first resin onto the inner wall of conduit 1.

Figure 1:
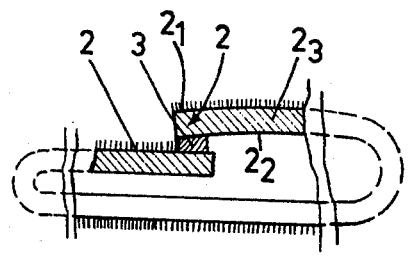
FIG. 1 shows schematically in cross-section an inner lining sleeve during assembly thereof.
Figure 2:
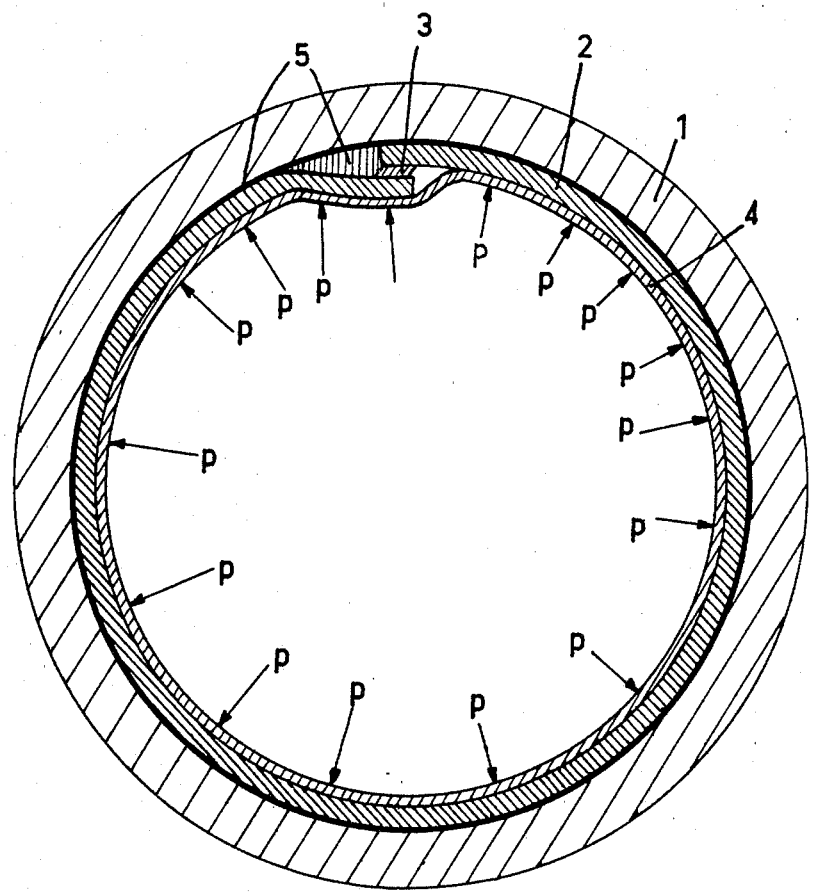
FIG. 2 shows schematically in cross-section a conduit against the inner wall of which a sleeve is applied by means of a sealed and flexible envelope subjected to the pressure of at least one fluid.

An inner lining sleeve 2 is prepared from a single impervious and flexible sheet of an appropriate synthetic material, whose surface intended to be the inner wall $2_2$ is smooth and whose surface intended to be the outer wall $2_1$ is fibrous (FIG. 1). The length of this sleeve 2 is substantially equal to the length of the conduit 1 to be lined. The width of sleeve 2 is slightly greater than the periphery of the inner section of conduit 1. To form the inner lining sleeve 2, the sheet is folded, for example as is shown in FIG. 1, along its width, over the whole of its length so as to form a flanged joint. For that, the outer wall of one end of the width of the sheet is fixed to the inner wall of the other end of the width of the sheet by means of a sealing compound 3 which may undergo plastic deformation. Thus, during assembly of sleeve 2, compound 3 has the approximate shape of a rectangular-based parallelepiped over the whole length of the joint. When, after sleeve 2 has been introduced into conduit 1, this latter is subjected to an inner pressure p so that its outer wall is applied against the inner wall of conduit 1, the section of sleeve 2 may increase due to the plastic deformation of the sealing compound joint 3. The vertical walls of joint 3 slope so that this latter assumes the shape of a parallelepiped with a substantially rhomboidal base (FIG. 2).

It comes within the scope of the invention to form the inner lining sleeve by folding the sheet, along its width, over the whole of its length so as to form an edge-to-edge joint. For that, the width of the sheet is equal to the periphery of the inner section of conduit 1. The fixed connection between the edges is formed, in this case, in any appropriate way, such as by welding, bonding, application of a butt-strip, etc.

With sleeve 2 formed, a light, flexible and fluidtight envelope 4 is introduced into the sleeve.

It is also possible to dispose envelope 4 in the sleeve before formation of this latter by placing said envelope 4 on the smooth face of the opened-out sheet; envelope 4 remains in place during formation of the sleeve which is effected by folding back its edges.

Figure 3:
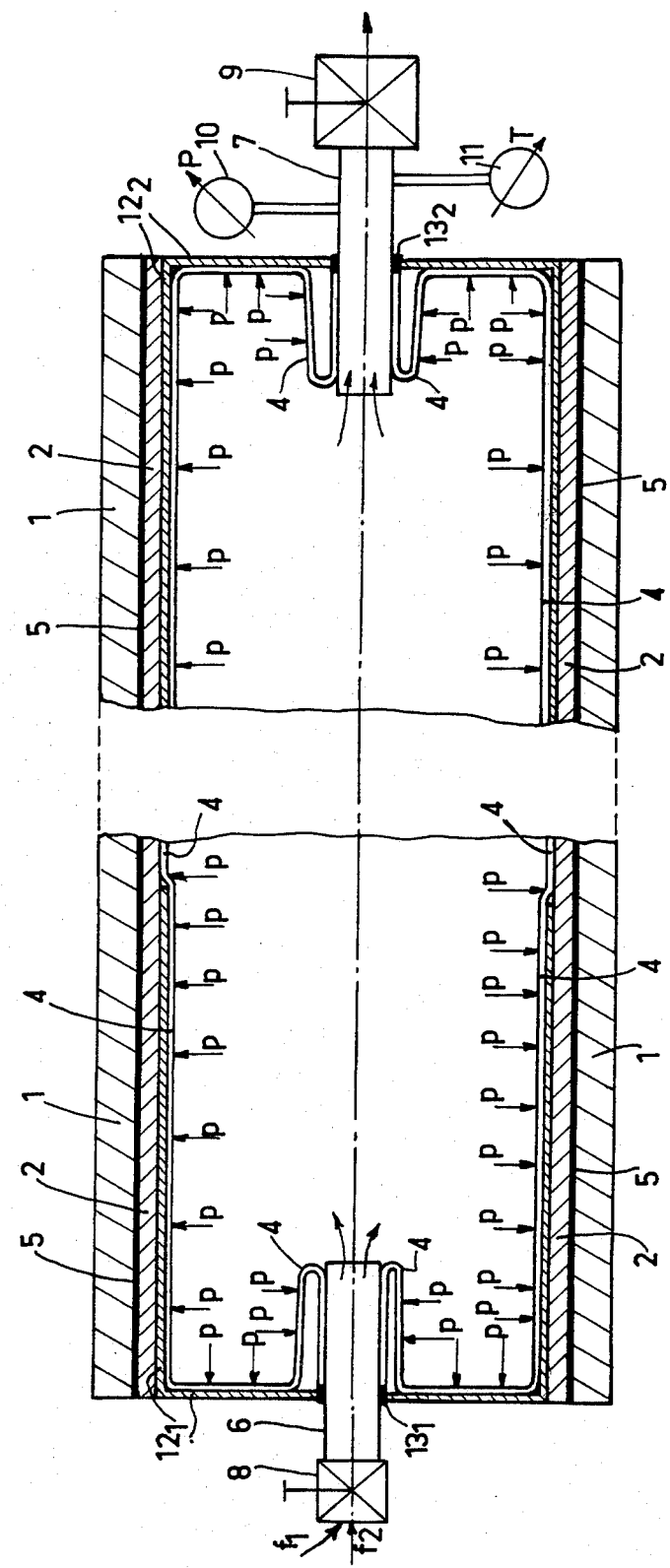
FIG. 3 shows schematically, in longitudinal section, a conduit against the inner wall of which a sleeve is applied by means of a flexible and fluidproof envelope subjected to the pressure of at least one fluid.

The length of this envelope 4 is greater than that of conduit 1. Furthermore, the ends of envelope 4 extend beyond those of sleeve 2 and conduit 1. Each end of envelope 4 is connected to a pipe 6, 7 (FIG. 3). These pipes 6, 7 are fixed by means of joints $13_1$, $13_2$ to the front and back of envelope 4. A part of each pipe may penetrate inside the envelope. Each pipe is provided with means for connecting to a closure valve 8, 9. A first pipe 6 mounted in a first end of envelope 4 serves for introducing at least one pressurized fluid p, whereas a second pipe 7 mounted in a second end of envelope 4 serves for at least the partial removal of at least one fluid during the operation for applying the sleeve against the conduit. Advantageously, at least said second pipe is provided with means for fitting to a pressure gauge and/or a thermometer. The section of envelope 4 is such that, when it is inflated, sleeve 2 is firmly applied to the inner wall of conduit 1.

Then the inner wall of conduit 1 is coated with a first resin by means of a propeller distributing apparatus such as mentioned above. It is furthermore possible to use the same apparatus for cleaning conduit 1 and for applying the resin on the inner wall thereof.

The fibrous outer wall $2_1$ of sleeve 2 is also coated with a second resin.

The first resin and the second resin are preferably identical or complementary so as to form a single polymerizable layer.

The sleeve 2 and envelope 4 assembly is introduced into the conduit so that the ends of envelope 4 extend beyond the ends of conduit 1 and sleeve 2 which are substantially the same length.

At each end of envelope 4, over each of pipes 6, 7 a cap $12_1$, $12_2$ is slidingly fitted and secured. Each of caps $12_1$, $12_2$ comprises a tubular portion and a bottom. The length of the tubular portion is substantially greater than the diameter of the bottom so that the frictional force between the tubular portion and the inner wall of the sleeve is at least equal to and preferably greater than the total pressure exerted on the bottom of the cap, when envelope 4 is completely inflated. The caps are consequently formed from a strong and flexible material.

It is now possible to fit the valves 8, 9 to pipes 6, 7.

A first fluid f1 is introduced under a pressure of 0.2 to 2 bars into the envelope 4 through pipe 6. This fluid may be air at a temperature of about 20° C. But any other fluid may be used. During this time, pipe 7 on the outlet side of envelope 4 is closed by valve 9. The procedure for inflating envelope 4 is continued until sleeve 2 is firmly applied against the inner wall of conduit 1 with the layer of resin 5 therebetween.

The application of pressure is maintained until polymerization of resin layer 5 is completed.

To obtain the optimum polymerization temperature for the resin and to maintain this temperature during the period of polymerization, a second hot fluid f2 is injected through pipe 6. Valve 9 is opened sufficiently to allow at least part of the first cold fluid to be removed and to ensure that the sleeve-applying pressure p and the temperature in envelope 4 remain substantially constant during polymerization of resin layer 5, the pressure and the temperature being checked by means of the pressure gauge 10 and thermometer 11 respectively. This second fluid is for example a spray of water which is injected into envelope 4 at an appropriate pressure to ensure rapid diffusion thereof over the whole length of envelope 4 and at a temperature between 55° C. and 85° C. The droplets of water give up at least a part of their heat to the fluid, for example ambient air until the optimum temperature for polymerization of resin 5 has been reached. The procedure for injecting the two fluids is resumed and/or continued so as to maintain in envelope 4 a substantially constant temperature and pressure (for example 20° C. to 60° C., and 0.5 to 2 bars) until complete polymerization of the resin. The time required for complete polymerization of the resin depends essentially on its composition and on the temperature in envelope 4.

If an exothermically polymerizing resin is used, the heat released may be taken into consideration for adjusting the temperature and the pressure in envelope 4.

The injection of the second fluid may take place through a second pipe disposed in envelope 4 or through pipe 6.

When the polymerization is finished, envelope 4 is deflated and withdrawn from within sleeve 2. This latter is firmly applied against the inner wall of conduit 1. The water contained in envelope 4 is removed; envelope 4 may then be used again.

The process in accordance with the invention, as has been seen, enables an inner lining sleeve 2 to be perfectly applied against the inner wall of a conduit 1.

A large number of improvements and modifications may be made without departing from the spirit and scope of the invention as defined in the appended claims.

What is claimed is:

1. A process for internally lining a conduit, comprising the following steps:
    (a) cleaning of the inner wall of the conduit;
    (b) forming an inner lining sleeve from a single flexible and fluidtight sheet whose surface intended to be the inner wall is smooth and whose surface intended to be the outer wall is fibrous, the length of said sheet being substantially equal to the conduit to be lined and the width of this sheet being at least equal to the periphery of the inner section of said conduit;
    said sleeve having a cross-section capable of increasing when a pressure is applied to the inner wall thereof;
    (c) coating the inner wall of said conduit with a first resin; (d) introducing a light, flexible, fluidtight envelope, provided with at least one closable pipe at each of its ends, into said sleeve either before formation of this latter or after formation thereof, so that each of the ends of said envelope extends beyond the corresponding end of said sleeve; the cross section of said envelope being such that when it is inflated it may exert a pressure on the sleeve without undergoing plastic deformation so as to apply it against the conduit;
    (e) coating the outer fibrous wall of said sleeve with a second resin;
    (f) introducing the resin-coated sleeve and envelope disposed therein into said conduit
    (g) placing a flexible cap, comprising a tubular portion and a bottom over each of the ends of the envelope to retain said envelope in said sleeve, the length of said tubular portion being substantially greater than the external diameter of the bottom of the cap;
    said external diameter being smaller than the inner diameter of said sleeve so that, when said envelope is inflated, the tubular portion of said cap is firmly applied against said sleeve, said cap being held in position by the frictional force between the outer wall of said tubular portion thereof and the inner wall of said sleeve;
    (h) introducing a first pressurized fluid into said envelope through a first pipe disposed at a first end of said envelope, while the pipe(s) disposed at the other end of the envelope is (are) closed;
    continuing inflating said envelope until said sleeve is firmly applied against the inner wall of the conduit with a resin coat therebetween;
    (i) introducing a second hot fluid under pressure into said envelope, before polymerization of the resin(s), through a first or through a second pipe disposed at said first end of said envelope, the pipe or pipes disposed at said second end of the envelope being maintained sufficiently open to allow the first fluid to escape at least partially;
    continuing said introduction of said hot fluid until a sufficiently high temperature is reached in said envelope to cause complete polymerization of the resin(s) disposed between the outer wall of the sleeve and the inner wall of the conduit,
    (j) deflating said envelope and withdrawing said envelope from the sleeve when said inner lining sleeve is firmly bonded to said inner wall;
    (k) removing the water which has accumulated in the envelope during step (i).

2. The process as claimed in claim 1, wherein said cleaning of the conduit is effected by projecting under pressure a detergent or grease-remover onto said inner wall followed by rinsing with a spray of water at a temperature of 65° C. to 85° C., at a pressure of 120 to 140 bars.

3. The process as claimed in claim 1 or claim 2, wherein said sleeve is formed from a sheet having a width equal to the periphery of the inner section of said conduit by folding thereof along its width over the whole of its length so as to create an extensible edge-to-edge joint, and connecting the edges.

4. The process as claimed in claim 1, wherein said sleeve is formed from a sheet having a width slightly greater than the periphery of the inner section of said conduit by folding thereof along its width over the whole of its length so as to create a flanged joint, the fixed connection between the outer wall of the sleeve and the inner wall thereof and the position of the flange consisting of a sealing compound which allows said sleeve to expand its cross section when deformed under the action of a pressurized fluid on the inner wall of the sleeve until the resin-coated outer wall of the sleeve is firmly applied to the inner wall of the conduit also coated with resin.

5. The process of claims 1 or 2, wherein said envelope consists of flexible and light plastic material having a cross section at least equal to the inner cross section of said sleeve.

6. The process of claim 1, wherein said first resin and said second resin consist of the same material, or of materials compatible with one another.

7. The process as claimed in claim 6, wherein said resin polymerizes exothermically.

8. The process of claim 1 wherein said first said fluid is air under a pressure going from 0.2 to 2 bars.

9. The process of claim 1 wherein the second said fluid is hot water at a temperature going from 55° C. to 85° C.

10. The process as claimed in claim 1, wherein the injection into the flexible envelope of said first fluid and of said second fluid is effected through a pipe disposed at said first end of said envelope.

11. The process as claimed in one of claims 9 or 10, wherein, during polymerization of the resin (s), the temperature in the envelope is maintained at a value of about 20° C. to 60° C. by appropriate adjustment of the quantity and the temperature of the hot water injected into the envelope and by controlling the quantity and/or the pressure and the temperature of the fluid removed through the pipe disposed at said second end of the envelope.

12. The process of claim 1, wherein at least said second end of said envelope is provided with means for measuring the pressure and/or the temperature of the fluid(s) in said envelope.

* * * * *